US007246523B2

(12) United States Patent
Magane et al.

(10) Patent No.: US 7,246,523 B2
(45) Date of Patent: Jul. 24, 2007

(54) ULTRASONIC SENSOR (75) Inventors: Fumimasa Magane, Anjo (JP); Yasuhiro Kawashima, Okazaki (JP)

(73) Assignee: DENSO Corporation, Kariya (JP)

( * ) Notice: Subject to any disclaimer, the term of this patent is extended or adjusted under 35 U.S.C. 154(b) by 191 days.

(21) Appl. No.: 11/199,078

(22) Filed: Aug. 9, 2005

(65) Prior Publication Data
US 2006/0032286 A1 Feb. 16, 2006

(30) Foreign Application Priority Data
Aug. 11, 2004 (JP) .............................. 2004-234447

(51) Int. Cl.
*G01N 29/00* (2006.01)
(52) U.S. Cl. .......................... 73/649; 73/579
(58) Field of Classification Search .................. 73/649, 73/579, 702; 381/114, 173, 190
See application file for complete search history.

(56) References Cited

U.S. PATENT DOCUMENTS

| 4,368,400 | A | * | 1/1983 | Taniguchi et al. | .......... 310/322 |
| 4,755,975 | A | * | 7/1988 | Ito et al. | ...................... 367/140 |
| 7,009,326 | B1 | * | 3/2006 | Matsuo et al. | ............... 310/324 |

FOREIGN PATENT DOCUMENTS

| JP | 359188298 | A | * | 10/1984 |
| JP | 401222599 | A | * | 9/1989 |
| JP | 402011099 | A | * | 1/1990 |
| JP | 402036700 | A | * | 2/1990 |
| JP | U-H05-74099 | | | 10/1993 |
| JP | 409083623 | A | * | 3/1997 |
| JP | A-H09-252498 | | | 9/1997 |
| JP | A-H90/252498 | | | 9/1997 |
| JP | 410332817 | A | * | 12/1998 |
| JP | A-H11-23332 | | | 1/1999 |
| JP | A-2002-238095 | | | 8/2002 |

* cited by examiner

*Primary Examiner*—Hezron Williams
*Assistant Examiner*—Jacques M. Saint-Surin
(74) *Attorney, Agent, or Firm*—Posz Law Group, PLC (57) ABSTRACT

An ultrasonic sensor includes an ultrasonic microphone having a circular vibration surface, a substantially cylindrical cushion unit where the ultrasonic microphone is inserted, and a case unit which has a fitting portion provided with a cylindrical engagement hole therein. The cushion unit and the fitting portion are respectively provided with cushion-side guide portions and fitting-side guide portions which are to be engaged with each other, so that the cushion unit is axially guided to be inserted into the fitting portion and restricted from circumferentially rotating. The cushion unit has cushion-side engagement portions, which are engaged with case-side engagement portions of the fitting portion and capable of bending toward a diametrically inner side of the cushion unit in the insertion of the cushion unit into the fitting portion.

17 Claims, 6 Drawing Sheets

ULTRASONIC SENSOR

CROSS REFERENCE TO RELATED APPLICATION

This application is based on a Japanese Patent Application No. 2004-234447 filed on Aug. 11, 2004, the disclosure of which is incorporated herein by reference.

FIELD OF THE INVENTION

The present invention relates to an ultrasonic sensor having an ultrasonic microphone.

BACKGROUND OF THE INVENTION

Generally, in an obstacle detection device for a vehicle, an ultrasonic sensor is attached to a bumper of the vehicle to send an ultrasonic wave to a rear side of the vehicle or a corner side thereof. When the ultrasonic wave is reflected by an obstacle and received by the ultrasonic sensor, the obstacle is detected.

The ultrasonic sensor is provided with a cylindrical ultrasonic vibrator, which is arranged in a cylindrical hole portion of a case unit. A cylindrical cushion member is disposed between the case unit and the ultrasonic vibrator to absorb a vibration caused by the ultrasonic vibrator. In this case, a circular vibration surface is formed at a front end of the ultrasonic vibrator, which is provided with a piezoelectric device.

When the piezoelectric device is energized, the vibration surface can be excited to vibrate by the piezoelectric device due to a piezoelectricity effect. Thus, the ultrasonic wave is sent. When the ultrasonic wave having been sent is reflected and received by the piezoelectric device, the piezoelectric device will generate a voltage due to a counter-piezoelectricity effect. In this case, the directivity of the ultrasonic vibrator in a horizontal direction is generally same with that in a vertical direction.

On the other hand, in the case where the vibration surface of the ultrasonic vibrator is formed to have an ellipse shape, the directivity of the ultrasonic vibrator in the horizontal direction can become different from that in the vertical direction so that the performance of the ultrasonic vibrator is improved. Considering that it is preferable for the vibration surface of the ultrasonic vibrator to have a circular shape, the ultrasonic vibrator (which directivity in horizontal direction is different from that in vertical direction) having the circular vibration surface is presented, for example, referring to JP-2002-238095A.

In this case, the outer surface of the cylindrical ultrasonic vibrator is partially flattened, so that the horizontal direction and the vertical direction of the ultrasonic vibrator can be properly discerned when being mounted.

When the cushion member (in which ultrasonic vibrator is inserted) is inserted into the hole portion of the case unit, protrusion portions which are arranged at an outer surface of the cushion member will be engaged with concave portions which are formed at a surface of the hole portion of the case unit. Thus, the cushion member is circumferentially positioned and restricted from rotating.

However, in this case, the cushion member is constructed to tightly contact the hole portion of the case unit. When the cushion member is inserted into the hole portion of the case unit, the protrusion portions which are to be inserted in the concave portions are not provided with a clearance to readily enter the hole portion. Therefore, the operation performance in an insertion of the cushion member into the hole portion is impaired. That is, the insertion operation of the cushion member is troublesome.

SUMMARY OF THE INVENTION

In view of the above-described disadvantage, it is an object of the present invention to provide an ultrasonic sensor, in which an ultrasonic microphone having a circular vibration surface, a cylindrical cushion unit and a case unit can be readily mounted. The directivity of the ultrasonic sensor, for example, in a horizontal direction is different from that in a vertical direction.

According to an aspect of the present invention, an ultrasonic sensor is provided with an ultrasonic microphone, a substantially cylindrical cushion unit and a case unit. The ultrasonic microphone includes a piezoelectric device and a housing member, which has a cylindrical side wall portion and a vibration portion disposed at a front end of the side wall portion. The vibration portion has a circular outer surface which is a vibration surface. The piezoelectric device is fixed to an inner surface of the vibration portion. The cushion unit has at least one cushion-side engagement portion, which axially protrudes from a rear end surface of the cushion unit. The cushion unit is resilient. The case unit is provided with a fitting portion, which has therein a cylindrical engagement hole and at least one case-side engagement portion formed at a surface of the engagement hole. The ultrasonic microphone is inserted in the cushion unit, and the cushion unit is inserted in the engagement hole. The cushion-side engagement portion is engaged with the case-side engagement portion so that the cushion unit is restricted from axially moving.

In this case, the cushion-side engagement portion axially protrudes from the rear end surface of the cushion unit, to be capable of bending toward the diametrically inner side of the engagement hole of the case unit when the cushion unit is inserted into the engagement hole. Therefore, the cushion-side engagement portion is provided with a sufficient clearance, so that the cushion unit can be readily inserted into the engagement hole as compared with the related art. Thus, the operation performance of the ultrasonic sensor is substantially improved.

Here, the front end side of the ultrasonic microphone (ultrasonic sensor) is the side where the vibration surface is arranged, and the rear end side is the side opposite to the front end side.

Preferably, the cushion-side engagement portion has a foot portion which extends in an axis direction of the cushion unit, and a nail portion which protrudes from the foot portion toward a diametrically outer side of the cushion unit. The case-side engagement portion is an engagement protrusion portion, which protrudes from the surface of the engagement hole of the fitting portion toward a diametrically inner side of the engagement hole to be engaged with the nail portion.

Accordingly, the cushion unit can be readily inserted into the engagement hole, and substantially fixed in the axis direction thereof.

More preferably, a width L2 of the cushion-side engagement portion is smaller than an inner diameter L1 of the cushion unit. The width L2 is a dimension in a diametrical direction of the cushion unit. The cylindrical engagement hole of the fitting portion is diameter-shortened and deformed at a rear end portion thereof to form a deformation penetration hole. The cushion-side engagement portion is fitted in the deformation penetration hole when the cushion unit is inserted in the engagement hole.

Because the cushion-side engagement portion is to be inserted in the deformation penetration hole, a mounting position deviation of the cushion-side engagement portion can be restricted.

According to another aspect of the present invention, an ultrasonic sensor is provided with an ultrasonic microphone, a substantially cylindrical cushion unit and a case unit. The ultrasonic microphone includes a housing member and a piezoelectric device. The housing member has a cylindrical side wall portion and a vibration portion disposed at a front end of the side wall portion. The vibration portion has a circular outer surface which is a vibration surface. The piezoelectric device is fixed to an inner surface of the vibration portion. The cushion unit is resilient. The case unit has a fitting portion, which is provided with a cylindrical engagement hole therein. The ultrasonic microphone is inserted in the cushion unit, and the cushion unit is inserted in the engagement hole of the fitting portion. The cushion unit and the fitting portion are respectively provided with at least one cushion-side guide portion and at least one fitting-side guide portion, which are engaged with each other. The cushion unit is axially guided to be inserted into the fitting portion, and restricted from circumferentially rotating.

Because the cushion-side guide portion and the fitting-side guide portion are engaged with each other when the cushion unit is inserted into the engagement hole of the fitting portion, the cushion unit can be axially guided and restricted from circumferential rotating. Accordingly, the insertion of the cushion unit into the case unit becomes considerably easy.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

First Embodiment

A first embodiment of the present invention will be described with reference to FIGS. 1-5. An ultrasonic sensor according to this embodiment is provided with an ultrasonic microphone 1, a cushion unit 17 and a case unit 29. The ultrasonic microphone 1 is inserted in the cushion unit 17, and the cushion unit 17 is inserted in the case unit 29. The ultrasonic sensor may be suitably used in, for example, an obstacle detection device for a vehicle. In this case, the ultrasonic sensor is mounted in a bumper of the vehicle to detect an obstacle at the rear side of the vehicle or the corner side thereof.

Figure 1A:
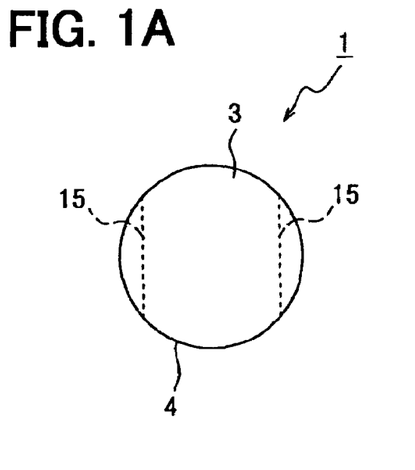
FIG. 1A is a front view showing an ultrasonic microphone 1 according to a first embodiment of the present invention.
Figure 1B:
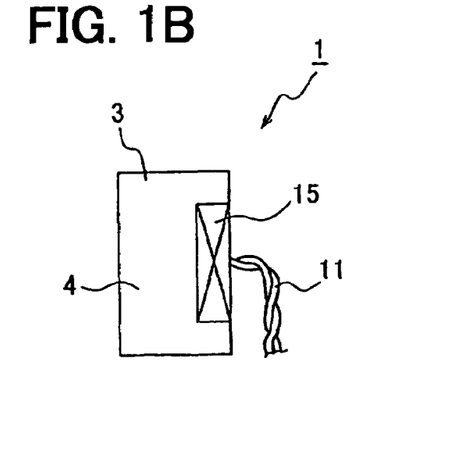
FIG. 1B is a right side view showing the ultrasonic microphone 1.
Figure 1C:
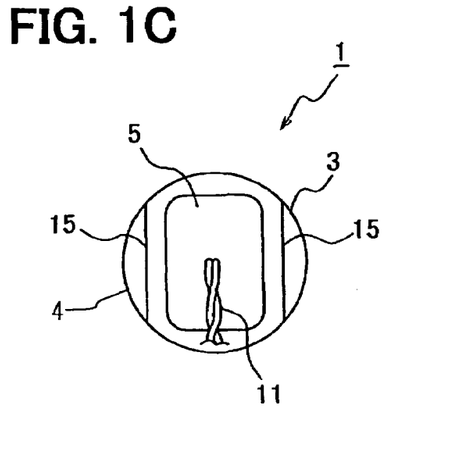
FIG. 1C is a rear view showing the ultrasonic microphone 1.
Figure 1D:
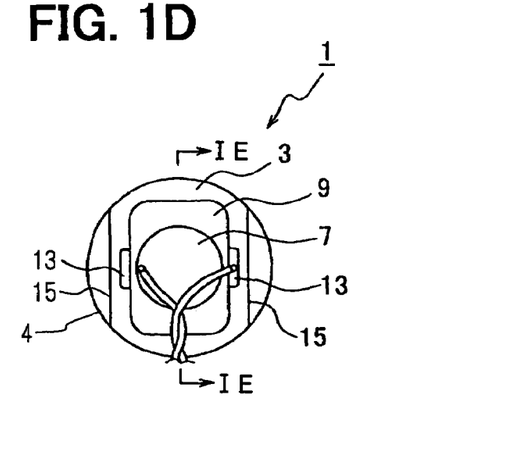
FIG. 1D is a rear view showing the ultrasonic microphone 1 when a stuffing member 5 is detached.
Figure 1E:
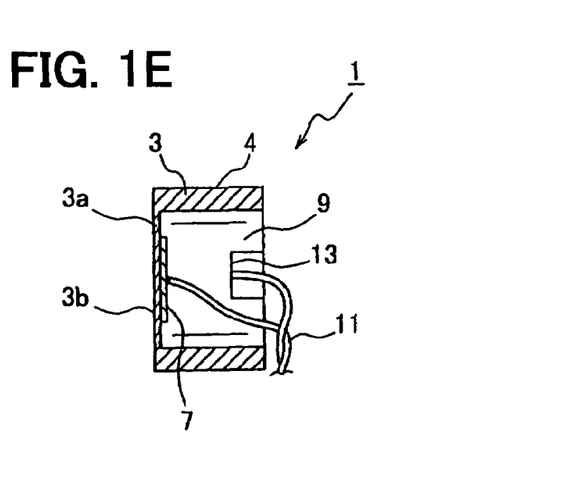
FIG. 1E is a vertical sectional view taken along a line IE-IE in FIG. 1D.

At first, the construction of the ultrasonic microphone 1 is described with reference to FIGS. 1A-1E. The ultrasonic microphone 1 includes a piezoelectric device 7 and a hollow housing member 3, which accommodates the piezoelectric device 7 and the like therein and is stuffed with a stuffing member 5 (e.g., felt and silicon rubber). The housing member 3 is electrically conductive. FIGS. 1A-1C show the ultrasonic microphone 1 in the case where the housing member 3 is provided with the stuffing member 5. FIGS. 1D and 1E shows the ultrasonic microphone 1 in the case where the stuffing member 5 is detached.

As shown in FIG. 1E, the housing member 3 has therein an inner space 9 with a substantial rounded-rectangle shape, for example. The housing member 3 is provided with a side wall portion 4 having a cylindrical outer surface, and a vibration portion 3a (vibration plate), which is disposed at a front end (left end in FIG. 1E) of the side wall portion 4 and has a round-shaped outer surface (i.e., vibration surface 3b). The piezoelectric device 7 is fixed to an inner surface of the vibration portion 3a by bonding, for example.

In this embodiment, the front side corresponds to the side where the vibration surface 3b is disposed, and the rear side corresponds to the side opposite to the front side.

The inner surface of the side wall portion 4 of the housing member 3 is notched to form at least one notch portion 13. Two ends of a lead wire 11 are respectively electrically connected with the piezoelectric device 7 and the notch portion 3 by soldering, for example. Thus, the piezoelectric device 7 can be supplied with an alternating signal through the housing member 3.

Referring to FIG. 1D, the inner space 9 with the rounded-rectangle shape is set to have an up-down direction dimension (longitudinal dimension) different from a left-right direction dimension (lateral dimension) thereof. Thus, the directivity of the ultrasonic microphone 1 in a horizontal direction (left-right direction) is different from that in a vertical direction (up-down direction). In this case, after the lead wire 11 is fixed to the piezoelectric device 7 by soldering or the like, the inner space 9 is padded sequentially with, for example, the felt and the silicon rubber of the stuffing member 5 from the side of the piezoelectric device 7.

Figure 2:
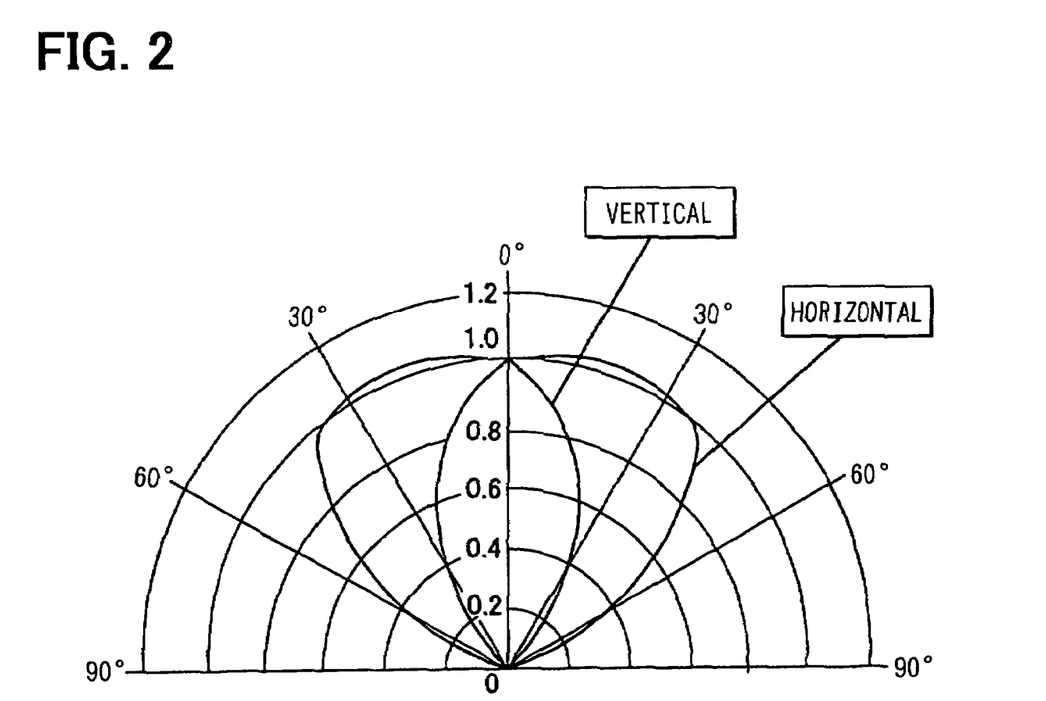
FIG. 2 is a diagram showing a directivity of the ultrasonic microphone 1 according to the first embodiment.

As shown in FIG. 2, the directivity of the ultrasonic microphone 7 in the horizontal direction (left-right direction in FIG. 1D) is more extensive than that in the vertical direction (up-down direction in FIG. 1D).

According to this embodiment, an outer surface of the side wall portion 4 of the housing member 3 is flattened at two opposite sides (e.g., left side and right side in FIG. 1D) thereof to form two plane portions 15 (housing-side identification portion), which are disposed at the rear end portion (at opposite side to vibration portion 3a) of the side wall portion 4. Each of the plane portions 15 has a flat surface. Thus, the up-down direction of the ultrasonic microphone 1 can be distinguished from the left-right direction thereof. In FIG. 1D, the left-right direction corresponds to the horizontal direction (in which directivity is extensive), and the up-down direction corresponds to the vertical direction (in which directivity is narrow).

Next, the construction of the cushion unit 17 is described referring to FIGS. 3A-3E.

The cushion unit 17, has a substantially cylindrical shape, is made of a silicon rubber or the like to be resilient. The cushion unit 17 is provided with a substantially cylindrical penetration hole 19 therein, which axially penetrates the cushion unit 17 and is shaped to correspond to the outer shape of the ultrasonic microphone 1. Thus, the ultrasonic microphone 1 can be coaxially inserted in the penetration hole 19. That is, the outer surface of the side wall portion 4 of the ultrasonic microphone 1 is to be engaged with the surface of the penetration hole 19.

Figure 3A:
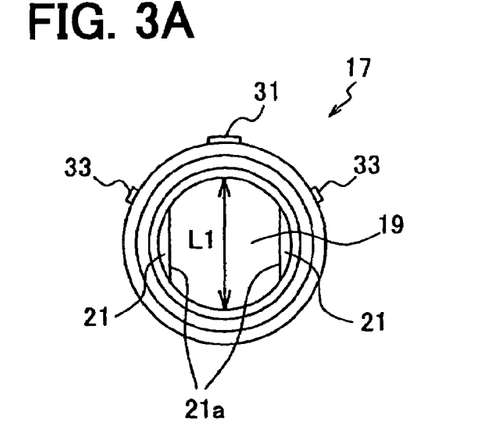
FIG. 3A is a front view showing a cushion unit 17 according to the first embodiment.
Figure 3B:
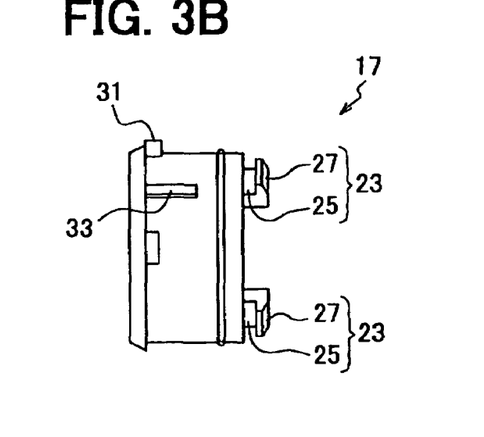
FIG. 3B is a right side view showing the cushion unit 17.
Figure 3C:
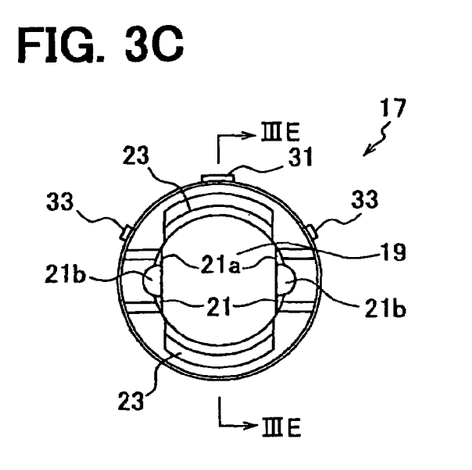
FIG. 3C is a rear view showing the cushion unit 17.

Referring to FIG. 3C, a pair of protrusion portions 21 (step portions) respectively protrude from the right and left sides of the surface of the penetration hole 19 toward the diametrically inner side of the penetration hole 19. The protrusion portions 21 are positioned at the rear end portion (right end portion in FIG. 3E) of the penetration hole 19. Each of the protrusion portions 21 is provided with a plane portion 21a (cushion-side identification portion) and a recess portion 21b (injection concave portion), which are formed at a surface of a protrusion side end of the protrusion portion 21.

As described above, the side wall portion 4 of the ultrasonic microphone 1 is provided with the plane portions 15, which are respectively formed at the left side and right side of the outer surface of the side wall portion 4. When the ultrasonic microphone 1 is inserted into the cushion unit 17, the plane portions 15 of the side wall portion 4 respectively contact the plane portions 21a of the protrusion portions 21. Therefore, the circumferential position of the ultrasonic microphone 1 with respect to the cushion unit 17 can be determined.

Figure 3D:
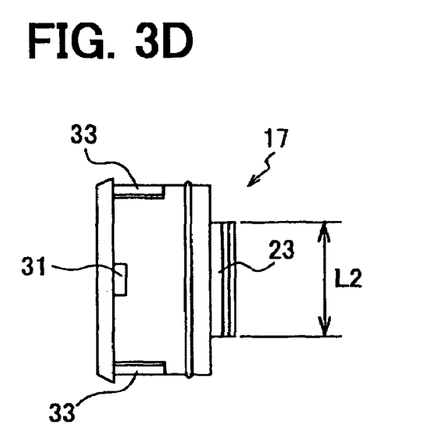
FIG. 3D is a plan view showing the cushion unit 17.
Figure 3E:
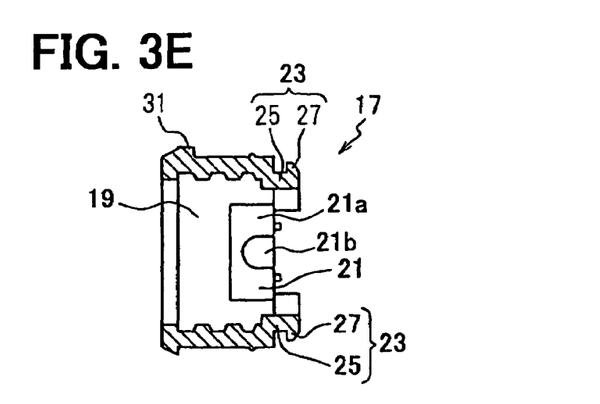
FIG. 3E is a vertical sectional view taken along a line IIIE-IIIE in FIG. 3C.

As shown in FIG. 3C, the recess portion 21b is recessed from the plane portion 21a of the protrusion portion 21 (disposed at rear portion of penetration hole 19) toward the diametrically outer side of the penetration hole 19. Referring to FIG. 3E, the recess portion 21b is enlarged at the rear end portion thereof. That is, the recess portion 21b has a larger width (in up-down direction in FIG. 3E) at the rear end portion than that at the front end portion thereof.

According to this embodiment, a substantially cylindrical tamper member 22 (described later referring to FIGS. 5A and 5B) will be arranged at the rear end of the penetration hole 19 and disposed at the rear side of the ultrasonic microphone 1, which is inserted in the cushion unit 17. The recess portion 21b is opened to the diametrically outer side of the tamper member 22. That is, the recess portion 22 diametrically extends to the outer side of the tamper member 22 to form an opening thereat. Thus, the ultrasonic microphone 1, the cushion unit 17 and the tamper member 22 can be bonded to each other by an adhesive material (described later), which is injected from the rear side of the ultrasonic microphone 1 into the opening formed by the recess portion 21b.

The cushion unit 17A is provided with a pair of cushion-side engagement portions 23, which axially protrude from a rear end surface thereof. The cushion-side engagement portions 23 are arranged to be opposite to each other, for example, at an upper portion and a lower portion of the cushion unit 17 with reference to FIG. 3B. That is, the cushion-side engagement portions 23 face each other. Each of the cushion-side engagement portions 23 is curved at a substantially same curvature with the cushion unit 17 to have an arc shape. Referring to FIG. 3D which is a plan view of the cushion unit 17, the width L2 (in diameter direction of cushion unit 17) of the cushion-side engagement portion 23 is smaller than the diameter L1 (i.e., inner diameter of cushion unit 17 with reference to FIG. 3A) of the penetration hole 19.

Each of the cushion-side engagement portions 23 includes a foot portion 25 which axially protrudes from the rear end surface of the cushion unit 17, and a nail portion 27 which is positioned at a protrusion-side tip of the foot portion 25. The nail portion 27 protrudes from the foot portion 25 toward the diametrically outer side of the penetration hole 19.

A cushion-side guide portion 31 and two cushion-side guide portions 33 (guide convex portions 31 and 33) protrude from an front end portion (left side in FIG. 3D) of the outer surface of the cushion unit 17, to circumferentially position the cushion unit 17 with respect to the case unit 29. Thus, a circumferential rotation of the cushion unit 17 can be restricted. Each of the cushion-side guide portions 31 and 33 has a substantially rectangular parallelepiped shape, for example. The two cushion-side guide portions 33 are respectively arranged at the right side and the left side of the cushion-side guide portion 31, referring to FIG. 3A. The cushion-side guide portion 31 is disposed at the substantial center between the two cushion-side guide portions 33, and has a smaller length (in axial direction of cushion unit 17) than each of the cushion-side guide portions 33.

The center angle (with criterion of axis of cushion unit 17) between the cushion-side guide portion 31 and each of the cushion-side guide portions 33 is set to be, for example, substantial 60°, when being viewed in the axis direction of the cushion unit 17. The cushion-side guide portions 31 and 33 are to be engaged with fitting-side guide portions 41 and 43 (described later), which are arranged at a fitting portion 37 of the case unit 29. Thus, when the cushion unit 17 is inserted into the fitting portion 37, the single mounting position of the cushion unit 17 with respect to the case unit 29 can be limited (determined).

Next, the construction of the case unit 29 is described referring to FIGS. 4A-4E.

The case unit 29 (made of rigid plastic, for example) includes a base portion 35 with a substantially rectangular parallelepiped shape, and the fitting portion 37 which has a substantial cylinder shape and protrudes from an outer surface of a front end of the base portion 35. The base portion 35 is provided with an inner space 38 to form an opening at the rear end of the base portion 35. The inner space 38 is communicated with a penetration hole 39 (engagement hole 39), which axially penetrates the fitting portion 37. The penetration hole 39 has a substantially cylinder shape and is coaxially arranged in the fitting portion 37. The cushion unit 17 is to be inserted in the penetration hole 39.

The fitting-side guide portion 41 and the two fitting-side guide portion 43 (guide notch portions 41 and 43) are arranged at the front end portion (left end portion in FIG. 4B) of the fitting portion 37, and shaped to correspond to the cushion-side guide portions 31 and 33 (guide convex portions 31 and 33) which are arranged at the outer surface of the cushion unit 17. The guide notch portions 41 and 43 may extend in the axis direction of the fitting portion 37, and the guide convex portions 31 and 33 may extend in the axis direction of the cushion unit 17.

According to this embodiment, the guide convex portions 31 and 33 are axially guided to be inserted in the guide notch portions 41 and 43, while the circumferential rotation of the cushion unit 17 can be restricted. When being viewed in the axis direction of the fitting portion 37, the center angle (with criterion of axis of fitting portion 37) between the guide notch portion 41 and each of the guide notch portions 43 is set to correspond to that (e.g., substantial 60°) of the guide convex portions 31 and 33. Thus, when the cushion unit 17 is inserted into the fitting portion 37 of the case unit 29, a single mounting position of the cushion unit 17 with respect to the fitting portion 37 can be determined.

Figure 4A:
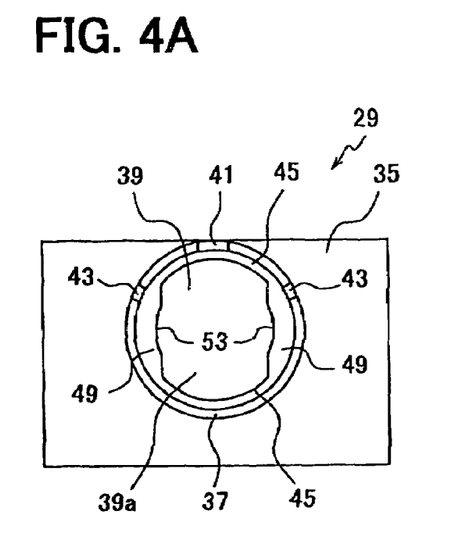
FIG. 4A is a front view showing a case unit 29 according to the first embodiment.
Figure 4B:
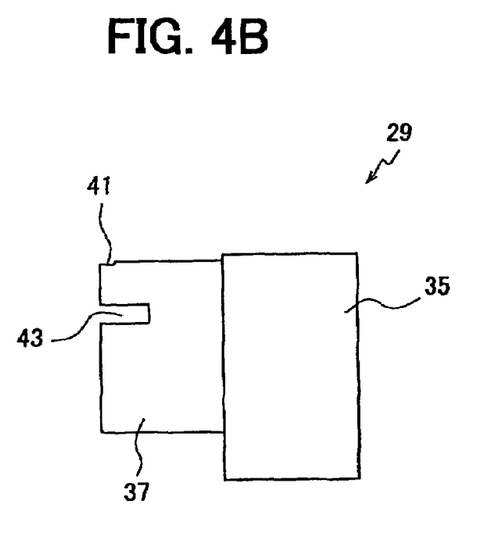
FIG. 4B is a right side view showing the case unit 29.
Figure 4C:
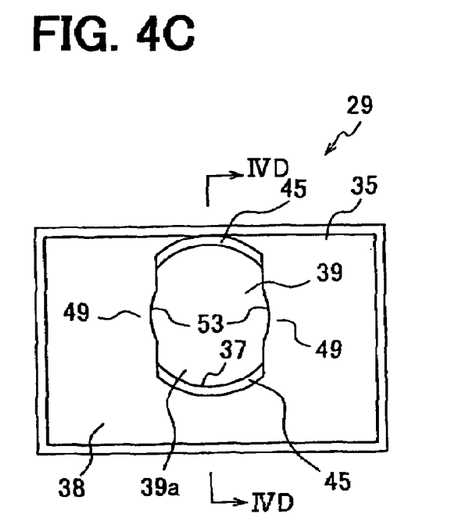
FIG. 4C is a rear view showing the case unit 29.

Referring to FIG. 4A, a pair of case-side engagement portions 45 (engagement protrusion portions 45) protrude from an surface of the engagement hole 39 toward the diametrically inner side thereof, and extend in the circumferential direction of the engagement hole 39 to have an arc shape (curve shape) when being viewed in the axis direction of the engagement hole 39. The width (in left-right direction of FIG. 4A) of the engagement protrusion portion 45 is equal to the width L2 of the cushion-side engagement portion 23. The engagement protrusion portions 45 are respectively arranged at the upper and lower sides of the rear end portion of the engagement hole 39.

Figure 4D:
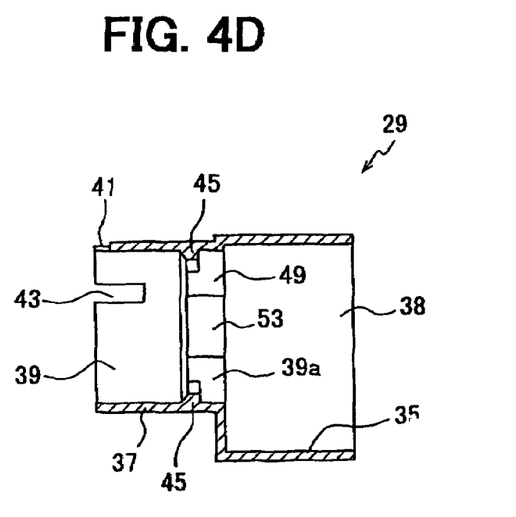
FIG. 4D is a vertical sectional view taken along a line IVD-IVD in FIG. 4C.

Moreover, a pair of prominence portions 49 respectively protrude from the right side and the left side of the surface of the rear end portion of the engagement hole 39. Thus, a deformation penetration hole 39a is formed at the rear end portion of the engagement hole 39. As shown in FIG. 4D, the prominence portions 49 may have a larger thickness (in axis direction of engagement hole 39) than the engagement protrusion portion 45, which is disposed in the deformation penetration hole 39a.

That is, the cylindrical engagement hole 39 is deformed and diameter-shortened at the rear end portion thereof, so that the deformation penetration hole 39a having a diametrical cross section with a substantial rectangle shape is formed. Referring to FIG. 4D, the frond end portion of the engagement hole 39 has a round-shaped diametrical cross section. With reference to FIG. 4A, the deformation penetration hole 39a has a left-right direction width, which is smaller than the diameter of the front end portion of the engagement hole 39 and substantially equal to the width L2 of the cushion-side engagement portion 23.

When the cushion unit 17 is inserted into the case unit 29, the cushion-side engagement portion 23 is fitted in the deformation penetration hole 39a. The nail portion 27 of the cushion-side engagement portion 23 is engaged with the engagement protrusion portions 45. The surface (where cushion-side engagement portion 23 is not provided) of the rear end of the cushion unit 17 contacts the front end surface of the prominence portion 49. Thus, the cushion unit 17 where the ultrasonic sensor 1 is inserted can be restricted from axially moving.

Figure 5A:
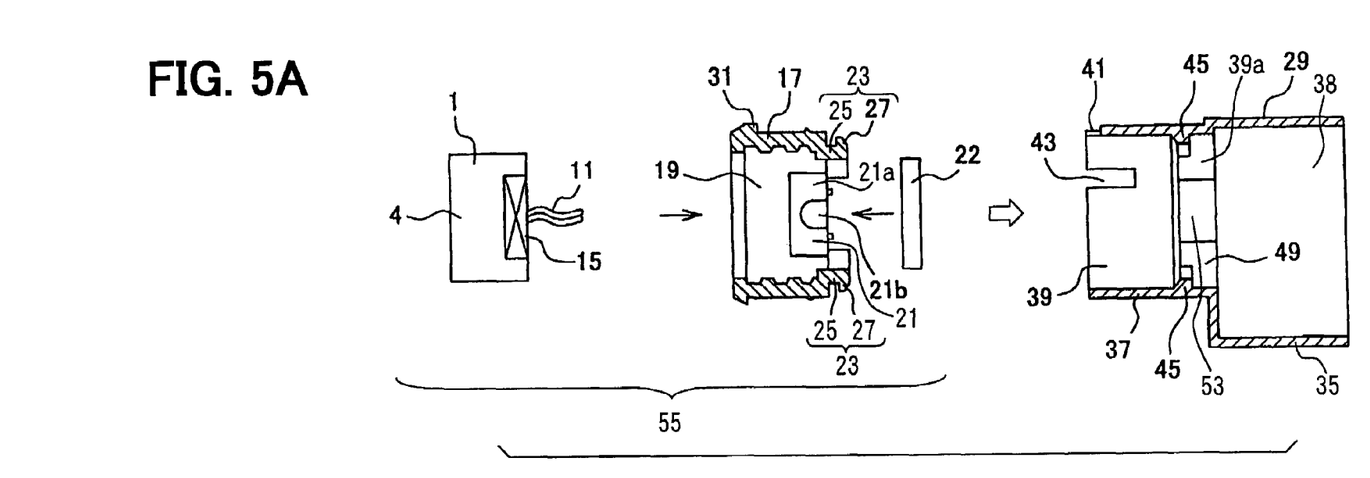
FIG. 5A is a disassembled view showing an ultrasonic sensor according to the first embodiment.
Figure 5B:
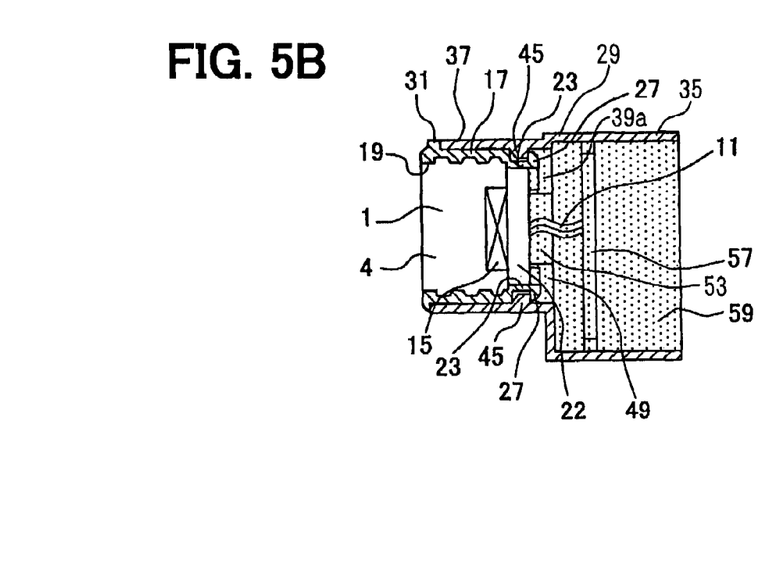
FIG. 5B is a longitudinally partially sectional view showing the ultrasonic sensor.

Each of the prominence portions 49 is provided with a concave portion 53, which has a substantial arc shape for an engagement with the tamper member 22 (referring to FIG. 5B). That is, in the diametrical cross section of the deformation penetration hole 39a, the deformation penetration hole 39a has the substantial rectangle shape which is curved in the up-down direction with reference to FIG. 4A.

According to this embodiment, the ultrasonic microphone 1, the cushion unit 17 and the fitting portion 37 of the case unit 29 are coaxially integrated. That is, the ultrasonic microphone 1 is inserted in the penetration hole 19 of the cushion unit 17, and the cushion unit 17 is inserted in the engagement hole 39 of the fitting portion 37.

Figure 5C:
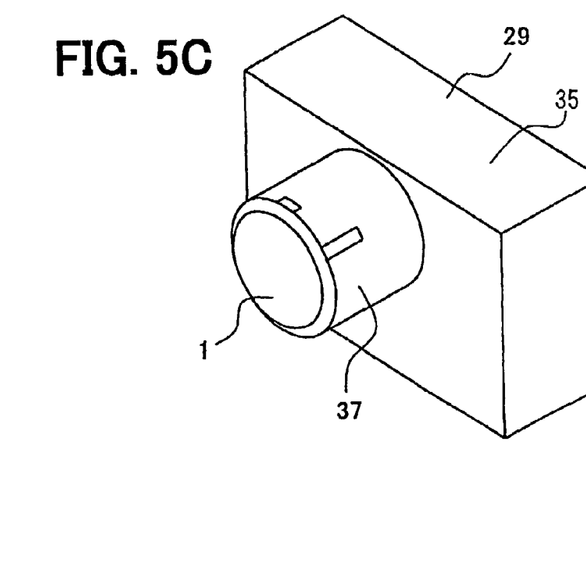
FIG. 5C is a perspective view showing the ultrasonic sensor.

Next, the whole construction of the ultrasonic sensor and the assembly thereof are described referring to FIGS. 5A-5C.

At first, the lead wire 11 of the ultrasonic microphone 1 is inserted through the penetration hole 19 of the cushion unit 17 from the front side of the penetration hole 19. Then, the ultrasonic microphone 1 is inserted into the penetration hole 19. In this case, the plane portions 15 of the side wall portion 4 of the ultrasonic microphone 1 contact the plane portions 21a arranged at the inner surface of the cushion unit 17, so that the circumferential position of the ultrasonic microphone 1 with respect to the cushion unit 17 is determined.

Next, the dish-shaped tamper member 22 is inserted into the cushion unit 17 from the rear side of the cushion unit 17, and contacts the rear end surface of the ultrasonic microphone 1 to attenuate a vibration caused by the ultrasonic microphone 1. The tamper member 22, having a cushion performance, is made of a foam rubber or the like. The tamper member 22 is arranged between the two cushion-side engagement portions 23 of the cushion unit 17 and engaged with them. In this case, the contact surface between the tamper member 22 and the ultrasonic microphone 1 is disposed at an axially inner side of the cushion unit 17 with respect to the cushion-side engagement portions 23.

Then, the adhesive material is injected into the recess portions 21b of the cushion unit 17 from the rear side of the cushion unit 17, so that the cushion unit 17, the ultrasonic microphone 1 and the tamper member 22 are integrally bonded.

Next, the ultrasonic microphone 1, the tamper member 22 and the cushion unit 17, which are integrated and called an ultrasonic component 55, are inserted into the engagement hole 39 of the fitting portion 37 of the case unit 29 from the front side of the engagement hole 39.

The guide convex portions 31 and 33, which are arranged at the outer surface of the cushion unit 17, are respectively engaged with (inserted into) the guide notch portions 41 and 43, which are formed at the fitting portion 37. In the insertion of the ultrasonic component 55, the guide convex portions 31 and 33 slide along the guide notch portions 41 and 43 in the axis direction of the cushion unit 17, and are restricted from rotating.

When the cushion-side engagement portion 23 of the cushion unit 17 contacts the engagement protrusion portion 45 of the engagement hole 39 in the insertion of the cushion unit 17, the cushion-side engagement portion 23 will be bent toward the diametrically inner side of the cushion unit 17. Then, the nail portion 27 of the cushion-side engagement portion 23 passes the engagement protrusion portion 45, and the cushion-side engagement portion 23 recovers (returns)

due to the resilience thereof. Thus, the nail portion 27 is engaged with the rear end surface (right end surface in FIG. 5B) of the engagement protrusion portion 45. Moreover, a part (where cushion-side engagement portions 23 are not provided) of the rear end surface of the cushion unit 17 contacts the front end surface of the prominence portion 49 of the case unit 29. Thus, the integrated ultrasonic component 55 is axially fixed to the case unit 29.

Thereafter, the lead wire 11 of the ultrasonic microphone 1 is joined to a base plate 57, which is arranged in the base portion 35 of the case unit 29. Then, the case unit 29 is filled with a stuffing material (e.g., silicon rubber) from the rear side of the base portion 35, so that a stuffing member 59 (which is painted by points in FIG. 5B) is formed by the solidified stuffing material in the case unit 29 and disposed at the rear side of the tamper member 22. The stuffing member 59 contacts the cushion unit 17. Thus, the cushion unit 17 made of the silicon rubber and the stuffing member 59 made of the silicon rubber are substantially bonded to each other. Accordingly, the integrated ultrasonic component 55 can be restricted from leaving the case unit 29.

According to this embodiment, the cushion-side engagement portion 23 axially protrudes from the rear end surface of the cushion unit 17. When the cushion unit 17 is inserted into the engagement hole 39, the cushion-side engagement portion 23 is to be engaged with the case-side engagement portion 45 so that the cushion unit 17 is axially fixed.

When the cushion unit 17 (in which the ultrasonic microphone 1 is inserted) is inserted into the engagement hole 39, the cushion-side engagement portion 23 is capable of bending toward the diametrically inner side of the engagement hole 39. That is, the cushion-side engagement portion 23 is provided with a sufficient clearance (space) to avoid the case-side engagement portion 45, as compared with the related art. Therefore, the cushion unit 17 can be readily inserted into the engagement hole 39. Thus, the operation performance of the ultrasonic sensor is considerably improved.

Moreover, according to this embodiment, the tamper member 22 is to be inserted between the cushion-side engagement portions 23 which are opposite to each other, so that the mounting accuracy of the tamper member 22 is bettered.

Furthermore, the recess portions 21b are formed at the inner surface of the rear end portion of the cushion unit 17. Thus, the adhesive material can be injected into the recess portions 21b from the rear side of the cushion unit 17, in which the ultrasonic microphone 1 is inserted. Therefore, the ultrasonic microphone 1, the cushion unit 17 and the tamper member 22 can be readily bonded to each other.

In this embodiment, the guide convex portions 31 and 33 are arranged at the outer surface of the cushion unit 17, while the guide notch portions 41 and 43 are formed at the fitting portion 37 of the case unit 29. When the cushion unit 17 is inserted into the engagement hole 39 of the fitting portion 37, the guide convex portions 31 and 33 are engaged with the guide notch portions 41 and 43. Therefore, the cushion unit 17 can be guided to axially slide in the insertion thereof, while being restricted from circumferentially rotating. Accordingly, the insertion of the cushion unit 17 into the engagement hole 39 becomes considerably easy.

Moreover, the one guide convex portion 31 and the two guide convex portions 33 are provided for the cushion unit 17, and arranged at three different circumferential positions (localized within half round) thereof. Similarly, the one guide notch portion 41 and the two guide notch portions 43 are formed at the fitting portion 37, and located at three different circumferential positions (localized within half round) thereof. Accordingly, the single insertion position of the cushion unit 17 in the fitting portion 37 can be determined. Thus, when the cushion unit 17 is inserted into the engagement hole 39, the insertion position of the cushion unit 17 can be readily discerned. Therefore, the operation performance of the ultrasonic sensor is further improved.

In this embodiment, the stuffing material such as the silicon rubber is injected into the rear portion of the case unit 29, and arranged at the rear side of the cushion unit 17 (in which the ultrasonic microphone 1 is inserted) and the tamper member 22. When the silicon rubber is solidified to form the stuffing member 59 which contacts the tamper member 22 and the cushion-side engagement portion 23, the components arranged in the case unit 29 can be integrated with the case unit 29 and restricted from leaving the case unit 29.

Second Embodiment

In the above-described first embodiment, the case-side engagement portion 45 of the fitting portion 37 is constructed to be the engagement protrusion portion, which is engaged with the cushion-side engagement portion 23 of the cushion unit 17. Thus, the cushion unit 17 is axially fixed. According to a second embodiment of the present invention, the case-side engagement portion 45 and the cushion-side engagement portion 23 can be also constructed with reference to FIG. 6A.

Figure 6A:
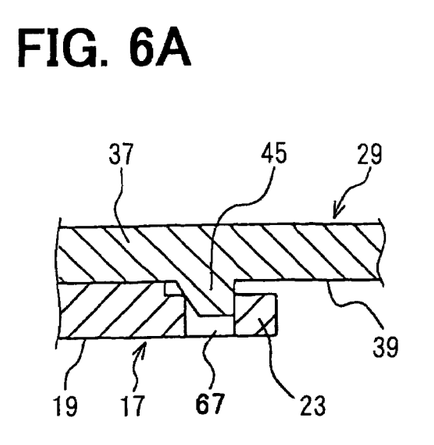
FIG. 6A is a cross-sectional view showing a partial construction of a cushion unit 17 and a case unit 29 according to a second embodiment of the present invention.

In this case, the cushion-side engagement portion 23 which axially protrudes from the rear end surface of the cushion unit 17 has a curved plate shape. That is, the nail portion 27 is omitted. The cushion-side engagement portion 23 is provided with a penetration hole 67, which penetrates it in the diameter direction of the cushion unit 17. Alternatively, the cushion-side engagement portion 23 can be also partially concaved in the diameter direction of the cushion unit 17, to form a recess portion instead of the penetration hole 67. The recess portion is arranged at the outer surface (at diametrically outer side of cushion unit 17) of the cushion-side engagement portion 23.

Correspondingly, the engagement protrusion portion 45 protrudes from the surface of the engagement hole 39 toward the diametrically inner side of the engagement hole 39, and is shaped to correspond to the shape of the penetration hole 67 (or recess portion) of the cushion-side engagement portion 23. Thus, the engagement protrusion portion 45 can be engaged with the penetration hole 67 (or recess portion), so that the cushion unit 17 is axially fixed.

Figure 6B:
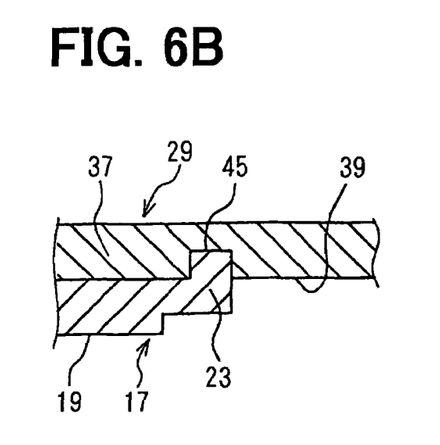
FIG. 6B is a cross-sectional view showing a partial construction of a cushion unit 17 and a case unit 29 according to a modification of the second embodiment.

As a modification of the second embodiment, the cushion unit 17 can be also axially fixed as shown in FIG. 6B. In this case, the cushion-side engagement portion 23 axially protrudes from the rear end surface of the cushion unit 17. The protrusion side end portion of the cushion-side engagement portion 23 extends in the substantial diameter direction of the cushion unit 17, to be disposed at the diametrically outer side of the cushion unit 17 with respect to the outer surface of the cushion unit 17. In this case, the case-side engagement portion 45 of the fitting portion 37 is a recess portion (or penetration hole), which is formed at the surface of the engagement hole 39 and shaped to correspond to the shape of the protrusion side end portion of the cushion-side engagement portion 23. Thus, the protrusion side end portion of the cushion-side engagement portion 23 can be inserted into (engaged with) the recess portion 45, so that the cushion unit 17 is axially fixed.

Third Embodiment

Figure 7A:
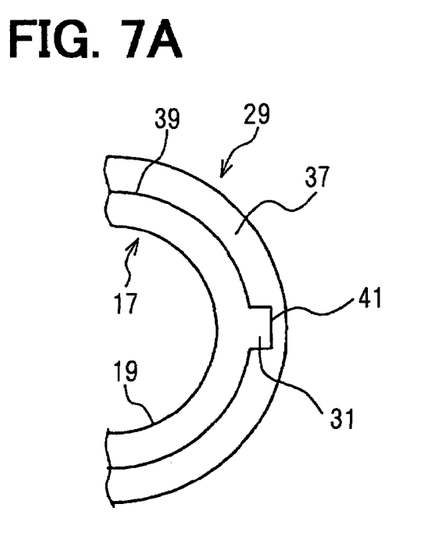
FIG. 7A is a schematic view showing a partial construction of a cushion unit 17 and a case unit 29 according to a third embodiment of the present invention.

In the first embodiment, the cushion-side guide portion 31 is constructed to be the guide convex portion, which is engaged with the guide notch portion 41 (fitting-side guide portion). Thus, the cushion unit 17 is circumferentially positioned. According to a third embodiment of the present invention, the cushion-side guide portion 31 of the cushion unit 17 and the fitting-side guide portion 41 of the fitting portion 37 can be also constructed as shown in FIG. 7A.

In this case, the fitting-side guide portion 41 is a guide concave portion which is formed at the surface of the engagement hole 39 of the fitting portion 37, and shaped to correspond to the shape of the guide convex portion 31 (cushion-side guide portion) which protrudes from the outer surface of the cushion unit 17 toward the diametrically outer side of the cushion unit 17. Thus, the guide convex portion 31 can be axially guided and inserted into the guide concave portion 41. Thus, the cushion unit 17 is circumferentially fixed.

Figure 7B:
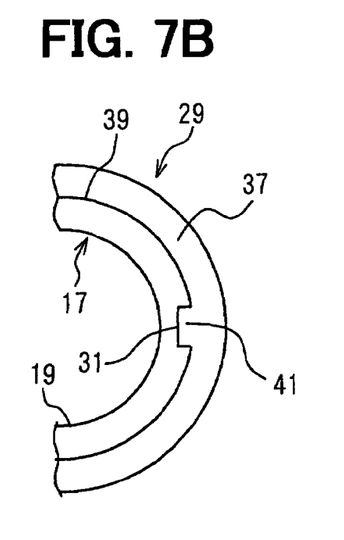
FIG. 7B is a schematic view showing a partial construction of a case unit 17 and a case unit 29 according to a modification of the third embodiment.

As a modification of the third embodiment, the fitting-side guide portion 41 and the cushion-side guide portion 31 can be also constructed as shown in FIG. 7B. In this case, the cushion-side guide portion 31 is a guide concave portion, which is formed at the outer surface of the cushion unit 17. The fitting-side guide portion 41 is a guide convex portion, which protrudes from the surface of the engagement hole 39 of the fitting portion 37 toward the diametrically inner side of the fitting portion 37 and shaped to correspond to the shape of the guide concave portion 31. Thus, the guide concave portion 31 can be axially guided and engaged with the guide convex portion 41. Thus, the cushion unit 17 is circumferentially fixed.

What is claimed is:

1. An ultrasonic sensor comprising:
   an ultrasonic microphone including:
      a housing member having a cylindrical side wall portion and a vibration portion disposed at a front end of the side wall portion, the vibration portion having a circular outer surface which is a vibration surface; and
      a piezoelectric device which is fixed to an inner surface of the vibration portion;
   a substantially cylindrical cushion unit having at least one cushion-side engagement portion which axially protrudes from a rear end surface of the cushion unit, the cushion unit being resilient; and
   a case unit having a fitting portion which is provided with a cylindrical engagement hole therein, at least one case-side engagement portion being formed at a surface of the engagement hole, wherein:
   the ultrasonic microphone is inserted in the cushion unit, and the cushion unit is inserted in the engagement hole; and
   the cushion-side engagement portion is engaged with the case-side engagement portion so that the cushion unit is restricted from axially moving.

2. The ultrasonic sensor according to claim 1, wherein:
   the cushion-side engagement portion has a foot portion which extends in an axis direction of the cushion unit, and a nail portion which protrudes from the foot portion toward a diametrically outer side of the cushion unit; and
   the case-side engagement portion is an engagement protrusion portion, which protrudes from the surface of the engagement hole of the fitting portion toward a diametrically inner side of the engagement hole to be engaged with the nail portion.

3. The ultrasonic sensor according to claim 1, wherein:
   a width L2 of the cushion-side engagement portion is smaller than an inner diameter L1 of the cushion unit, the width L2 being a dimension in a diametrical direction of the cushion unit;
   the cylindrical engagement hole of the fitting portion is diameter-shortened and deformed at a rear end portion thereof to form a deformation penetration hole at the rear end portion; and
   the cushion-side engagement portion is fitted in the deformation penetration hole when the cushion unit is inserted in the engagement hole.

4. The ultrasonic sensor according to claim 3, wherein the deformation penetration hole has a diametrical cross section with a substantial rectangle shape, which is curved in an up-down direction.

5. The ultrasonic sensor according to claim 4, wherein:
   the case unit has a pair of prominence portions, which respectively protrude from a right side and a left side of a surface of the deformation penetration hole; and
   each of the prominence portions has a concave portion with a substantial arc shape.

6. The ultrasonic sensor according to claim 1, further comprising
   a cylindrical tamper member, which is inserted in the cushion unit and arranged at a rear side of the ultrasonic microphone, wherein
   the tamper member contacts the ultrasonic microphone to attenuate a vibration of the ultrasonic microphone, a contact surface between the tamper member and the ultrasonic microphone being disposed at an axially inner side of the cushion unit with respect to the cushion-side engagement portion.

7. The ultrasonic sensor according to claim 6, wherein
   the cushion unit has at least an injection concave portion, into which an adhesive material for bonding the tamper member is injected from a rear side of the cushion unit, the injection concave portion being formed at an inner surface of the cushion unit and disposed at a rear end portion thereof.

8. The ultrasonic sensor according to claim 1, wherein:
   the cushion-side engagement portion has a penetration hole, which penetrates the cushion-side engagement portion in a diametrical direction of the cushion unit; and
   the case-side engagement portion is an engagement protrusion portion, which protrudes from the surface of the engagement hole toward a diametrically inner side of the engagement hole to be engaged with the penetration hole.

9. The ultrasonic sensor according to claim 1, further comprising
   a stuffing member formed by a solidified stuffing material, which is injected into a rear end portion of the case unit, wherein
   the stuffing member contacts the cushion unit which is inserted in the case unit, the ultrasonic microphone being inserted in the cushion unit.

10. The ultrasonic sensor according to claim 9, wherein the cushion unit and the stuffing member are made of a silicon rubber and bonded to each other.

11. The ultrasonic sensor according to claim 1, wherein:
the housing member has at least one housing-side identification portion for distinguishing a horizontal direction of the ultrasonic microphone from a vertical direction thereof; and
the cushion unit has at least one cushion-side identification portion, which contacts the housing-side identification portion when the ultrasonic microphone is inserted in the cushion unit.

12. The ultrasonic sensor according to claim 11, wherein:
the housing-side identification portion is a plane portion, which is formed at a rear portion of an outer surface of the side wall portion; and
the cushion-side identification portion is a plane portion formed at a protrusion portion, which protrudes from the inner surface of the cushion unit toward the diametrically inner side of the cushion unit.

13. An ultrasonic sensor comprising:
an ultrasonic microphone including:
  a housing member having a cylindrical side wall portion and a vibration portion disposed at a front end of the side wall portion, the vibration portion having a circular outer surface which is a vibration surface; and
  a piezoelectric device which is fixed to an inner surface of the vibration portion;
a substantially cylindrical cushion unit which is resilient; and
a case unit having a fitting portion, which is provided with a cylindrical engagement hole therein, wherein:
the ultrasonic microphone is inserted in the cushion unit, and the cushion unit is inserted in the engagement hole of the fitting portion; and
the cushion unit and the fitting portion are respectively provided with at least one cushion-side guide portion and at least one fitting-side guide portion which are to be engaged with each other, so that the cushion unit is axially guided to be inserted into the fitting portion and restricted from circumferentially rotating.

14. The ultrasonic sensor according to claim 1, wherein the cushion unit and the fitting portion are respectively provided with at least one cushion-side guide portion and at least one fitting-side guide portion which are to be engaged with each other, so that the cushion unit is axially guided to be inserted into the fitting portion and restricted from circumferentially rotating.

15. The ultrasonic sensor according to claim 13, wherein:
the cushion-side guide portion is a guide convex portion, which protrudes from an outer surface of the cushion unit;
the fitting-side guide portion is a guide notch portion, which is formed at the fitting portion and extends in an axis direction of the fitting portion; and
the guide convex portion is inserted into the guide notch portion.

16. The ultrasonic sensor according to claim 13, wherein:
the cushion unit has the three cushion-side guide portions, a center angle between the adjacent cushion-side guide portions being substantial 60° when being viewed in the axis direction of the cushion unit; and
the fitting portion has the three fitting-side guide portions, a center angle between the adjacent fitting-side guide portions being substantial 60° when being viewed in the axis direction of the fitting portion.

17. The ultrasonic sensor according to claim 13, wherein the cushion-side guide portion and the fitting-side guide portion are positioned to determine a single circumferential mounting position of the cushion unit, in an insertion of the cushion unit into the fitting portion.

* * * * *